United States Patent
Ikeda

[11] 3,827,781
[45] Aug. 6, 1974

[54] SUPER TELEPHOTO LENS SYSTEM HAVING A SMALL TELEPHOTO RATIO
[75] Inventor: Yoshitsugi Ikeda, Tokyo, Japan
[73] Assignee: Olympus Optical Company Limited, Tokyo, Japan
[22] Filed: Feb. 13, 1973
[21] Appl. No.: 332,194

[30] Foreign Application Priority Data
Mar. 1, 1972  Japan.................. 47-20608

[52] U.S. Cl.................. 350/220, 350/176, 350/177
[51] Int. Cl......................... G02b 9/34, G02b 13/02
[58] Field of Search .......... 350/220, 228, 216, 176, 350/177

[56] References Cited
UNITED STATES PATENTS
2,382,669  8/1945  Schade............................ 350/228
2,458,836  1/1949  Cox................................... 350/220

Primary Examiner—John K. Corbin
Attorney, Agent, or Firm—Waters, Roditi, Schwartz & Nissen

[57] ABSTRACT
A super telephoto lens system having a small telephoto ratio, which comprises front lens components consisting of a biconvex lens element, biconcave lens element and positive compound meniscus lens component, and a rear lens component spaced apart from said front lens components by a large air space inclusive of an iris diaphragm and consisting of a negative compound meniscus lens component, all lens elements being arranged in succession from the side of an object, and which is defined by the following five conditions, i.e.;

1. $f < -f_{234}$;
2. $0.04f < d_2 < 0.08f$;
3. $0.7 < -n_2 - 1f/r_3 < 1.2$;
4. $0.1 < n_4 - n_3$ and $25 < v_3 - v_4$; and
5. $n_6 < n_5$ and $0.015 < -n_6 - n_5f/r_9 < 0.05$ where $f$ is a composite focal length of the whole lens system; $f_{234}$ in a composite focal length of lens components consisting of the second, third and fourth lens elements; $d_2$ is an air space between the first biconvex lens element and the second biconcave lens element; $n_2$, $n_3$, $n_4$, $n_5$ and $n_6$ are refractive indexes of the second, third, fourth, fifth and sixth lens elements counted from the object side, respectively; $v_3$ and $v_4$ are Abbe's numbers of the third and fourth lens elements, respectively; and $r_3$ and $r_9$ are radii of curvatures of the front lens surfaces of the second and sixth lens elements, respectively.

2 Claims, 5 Drawing Figures

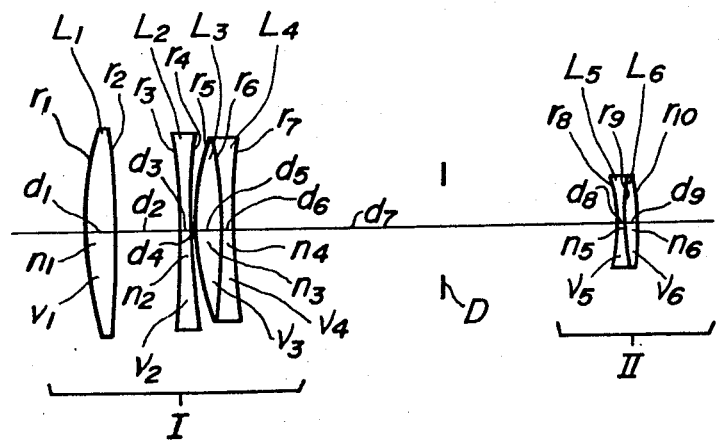
FIG_1
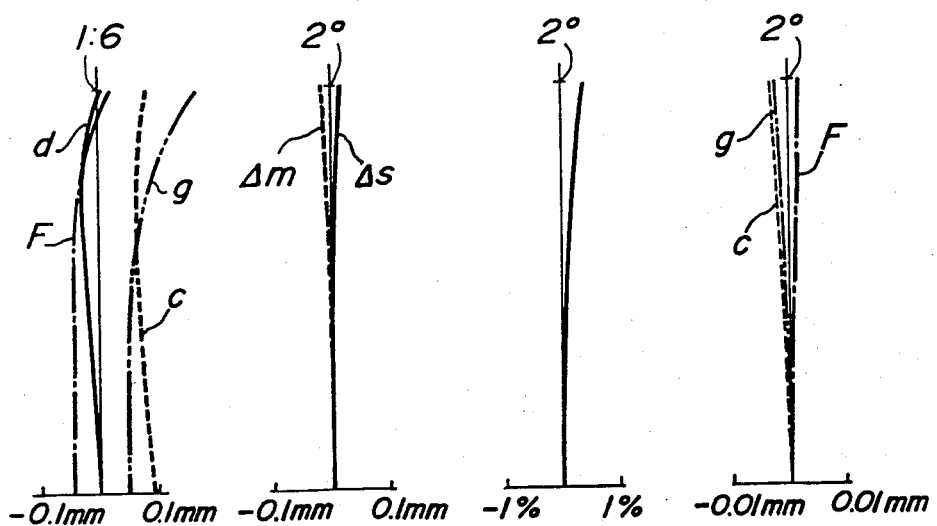
FIG_2a  FIG_2b  FIG_2c  FIG_2d

SUPER TELEPHOTO LENS SYSTEM HAVING A SMALL TELEPHOTO RATIO

This invention relates to a super telephoto lens system having a telephoto ratio smaller than 0.75, relative aperture of 1:6 and picture angle on the order of 4°.

In general, the telephoto ratio of a telephoto lens system is defined by

Total length of the lens system + Back focal length/Focal length

Thus, the smaller the telephoto ratio the easier the handling of the telephoto lens system. In order to make the telephoto ratio small, the positive value of the refractive power of a convex lens element in a front lens component must be made large, while the negative value of the refractive power of a rear lens component must be made large. As a result, the distribution of the refractive power of the lens system becomes unbalanced so that the correction of various aberrations becomes extremely difficult. The telephoto ratio of conventional telephoto lens systems, therefore, is on the order of 0.85 to 0.9. In addition, if the focal length of the telephoto lens system is made larger, the various aberrations are correspondingly increased, thereby causing remarkable deterioration of the image.

The object of the invention, by adopting suitable distribution of refractive powers and suitable selection of glass, is to provide a super telephoto lens system which can obviate the above mentioned disadvantage of the conventional telephoto lens systems and which has a telephoto ratio smaller than 0.75, relative aperture of 1:6 and picture angle on the order of 4°.

A feature of the invention is the provision of a super telephoto lens system having a small telephoto ratio, which comprises front lens components consisting of a biconvex lens element, biconcave lens element and positive compound meniscus lens component, and a rear lens component spaced apart from said front lens components by a large air space inclusive of an iris diaphragm and consisting of a negative compound meniscus lens, all lens elements being arranged in succession from the side of an object, and which is defined by the following five conditions, i.e.

1. $f < -f_{2\,3\,4}$;
2. $0.04f < d_2 < 0.08f$;
3. $0.7 < -n_2-1/r_3f < 1.2$;
4. $0.1 < n_4-n_3$ and $25 < \nu_3-\nu_4$; and
5. $n_6 < n_5$ and $0.015 < -n_6-n_5/r_9f < 0.05$ where $f$ is a composite focal length of the whole lens system; $f_{2\,3\,4}$ is a composite focal length of lens components consisting of second, third and fourth lens elements; $d_2$ is an air space between the first biconvex lens element and the second biconcave lens element; $n_2, n_3, n_4, n_5$ and $n_6$ are refractive indexes of the second, third, fourth, fifth and sixth lens elements counted from the object side, respectively; $\nu_3$ and $\nu_4$ are Abbe's numbers of the third and fourth lens elements, respectively; and $r_3$ and $r_9$ are radii of curvatures of the front lens surfaces of the second and sixth lens elements, respectively.

For a better understanding of the invention, the same will be explained by reference to the accompanying drawings, in which:

FIG. 1 shows in cross-section a super telephoto lens system constructed according to the invention; and FIGS. 2a to 2d show aberration characteristic curves of an embodiment of the invention shown in FIG. 1.

Referring to the drawings, an embodiment of the super telephoto lens system according to the invention is shown in FIG. 1 in which I and II designate front and rear lens components, respectively. The front lens component I consists of a biconvex lens element $L_1$, a biconcave lens element $L_2$ and a positive compound meniscus lens component comprising a biconvex lens element $L_3$ combined with a biconcave lens element $L_4$. The rear lens component II is a negative compound meniscus lens component comprising a biconcave lens element $L_5$ combined with a biconvex lens element $L_6$. D designates an iris diaphragm.

In accordance with the invention the focal length $f$; composite focal length $f_{2\,3\,4}$ of the second, third and fourth lens elements $L_2$, $L_3$ and $L_4$; air space $d_2$ between the first and second lens elements $L_1$ and $L_2$; refractive indexes $n_2, n_3, n_4, n_5$ and $n_6$ of the second, third, fourth, fifth and sixth lens elements $L_2$, $L_3$, $L_4$, $L_5$ and $L_6$, respectively; and radii of curvatures $r_3$ and $r_9$ of the front lens surfaces of the second and sixth lens elements $L_2$ and $L_6$, respectively, are chosen such that they are defined by the following five conditions, i.e.

1. $f < -f_{2\,3\,4}$;
2. $0.04f < d_2 < 0.08f$;
3. $0.7 < -n_2-1/r_3f < 1.2$;
4. $0.1 < n_4-n_3$ and $25 < \nu_3-\nu_4$; and
5. $n_6 < n_5$ and $0.015 < -n_6-n_5/r_9f < 0.05$ In accordance with the invention, if the composite focal length $f_{2\,3\,4}$ of the second lens element which is a biconcave lens element $L_2$ and the third and fourth lens elements $L_3$ and $L_4$ constituting a positive compound meniscus lens component is defined by the condition (1), a refractive power distribution which is suitable for making the telephoto ratio small may be obtained. That is, if the condition (1) is not satisfied, the refractive power of the first lens component that is a biconvex lens element $L_1$ must be increased so that the various aberrations of the whole lens system become remarkably unbalanced.

The condition (2) defines the air space $d_2$ between the first lens component which is a biconvex lens element $L_1$ and the second lens component which is a biconcave lens element $L_2$. The binconcave lens element $L_2$ whose refractive power of the concave surface at its object side is defined to satisfy the condition (3) is spaced apart from the biconvex lens element $L_1$ by the air space $d_2$ defined by the condition (2) for the purpose of correcting the aberration due to the light rays out of axis. Even when the condition (3) were satisfied, if $d_2$ would become smaller than the lower limit of the condition (2) the astigmatism becomes increased, while if $d_2$ would become larger than the upper limit of the condition (2) the coma of the rays that are not axial but inclined from the axis at the lower side thereof becomes deteriorated. In addition, even when the condition (2) is satisfied, if $-n_2- 1/r_3f$ becomes smaller than the lower limit of the condition (3), the refractive power of the lens system becomes too small to effectively correct the aberrations while if $-n_2-1r_3f$ becomes larger than the upper limit of the condition (3), the refractive power of the lens system becomes too large to easily correct the spherical aberration and coma.

The positive compound meniscus lens component $L_3$, $L_4$ spaced apart from the second biconvex lens element $L_2$ by a small air space should be made of glass selected to satisfy $n_4-n_3 > 0.1$ as defined by the condition (4) for the purpose of correcting the coma and preventing the Petzval sum from becoming more negative and also satisfy $\nu_3-\nu_4 > 25$ as defined by the condition (4) for the purpose of correcting the chromatic aberration. Under such condition (4), $n_3$ is obliged to have small numerical values so that the radius of curvature of the front surface of the positive compound meniscus lens component $L_3$, $L_4$ becomes comparatively small. The condition (4), however, is significantly effective to correct the coma and other aberrations of the super telephoto lens system having a large relative aperture according to the invention.

The condition (5) defines the relation among $n_5$, $n_6$ and $r_9$ of the rear lens component. That is, $n_6 < n_5$ is defined in order to correct the Petzval sum. In addition, the refractive power of the surface at which the lens elements $L_5$ and $L_6$ are combined together is made small as defined by $0.015 < -n_6-n_5/r_9 f < 0.05$ for the purpose of significantly correcting the chromatic aberration due to the magnification. If the refractive power of the surface at which the lens elements $L_5$ and $L_6$ are combined together becomes smaller than the lower limit or larger than the upper limit of the condition (5), a difficulty is encountered with correction of the coma relating to colors.

The invention will now be described with reference to the following example. The construction of the present embodiment is shown in FIG. 1.

nent, and a rear lens component spaced apart from said front lens components by a large air space inclusive of an iris diaphragm and consisting of a negative compound meniscus lens component, all lens elements being arranged in succession from the side of an object, and which is defined by the following five conditions, i.e.

1. $f < -f_{2\,3\,4}$;
2. $0.04 f < d_2 < 0.08 f$;
3. $0.7 < -n_2-1/r_3 f < 1.2$;
4. $0.1 < n_4-n_3$ and $25 < \nu_3-\nu_4$; and
5. $n_6 < n_5$ and $0.015 < -n_6-n_5/r_9 f < 0.05$ where $f$ is a composite focal length of the whole lens system; $f_{2\,3\,4}$ is a composite focal length of lens components consisting of second, third and fourth lens elements; $d_2$ is an air space between the first biconvex lens element and the second biconcave lens element; $n_2$, $n_3$, $n_4$, $n_5$ and $n_6$ are refractive indexes of the second, third, fourth, fifth and sixth lens elements counted from the object side, respectively; $\nu_3$ and $\nu_4$ are Abbe's numbers of the third and fourth lens elements, respectively; and $r_3$ and $r_9$ are radii of curvatures of the front lens surfaces of the second and sixth lens elements, respectively.

2. A super telephoto lens system having a small telephoto ratio as claimed in claim 1, wherein $f$ is 100 mm and the radii of curvatures of the sucessive lens elements $r_1$ to $r_{10}$, air spaces between the successive lens elements or axial thicknesses of the successive lens elements $d_1$ to $d_9$, refractive indexes of the sucessive lens

Example

| | | | | | | | |
|---|---|---|---|---|---|---|---|
| $L_1$ | $r_1$ | 30.684 | | | | | |
| | | | $d_1$ | 2.504 | $n_1$ | 1.48749 $\nu_1$ | 70.1 |
| | $r_2$ | −86.122 | | | | | |
| | | | $d_2$ | 5.587 | | | |
| $L_2$ | $r_3$ | −76.806 | | | | | |
| I | | | $d_3$ | 1.002 | $n_2$ | 1.80452 $\nu_2$ | 39.6 |
| | $r_4$ | 189.665 | | | | | |
| | | | $d_4$ | 0.200 | | | |
| | $r_5$ | 23.362 | | | | | |
| $L_3$ | | | $d_5$ | 2.337 | $n_3$ | 1.48749 $\nu_3$ | 70.1 |
| $L_4$ | $r_6$ | −54.291 | | | | | |
| | | | $d_6$ | 0.835 | $n_4$ | 1.61340 $\nu_4$ | 43.8 |
| | $r_7$ | 61.567 | | | | | |
| | | | $d_7$ | 33.643 | | | |
| | $r_8$ | −12.274 | | | | | |
| $L_5$ | | | $d_8$ | 0.584 | $n_5$ | 1.71300 $\nu_5$ | 54.0 |
| II | $r_9$ | 42.912 | | | | | |
| $L_6$ | | | $d_9$ | 1.002 | $n_6$ | 1.69895 $\nu_6$ | 30.1 |
| | $r_{10}$ | −24.038 | | | | | |

$f=100$; F 1:6; Telephoto ratio 0.70
$f_{2\,3\,4}=-168.39$
$-n_2-1/r_3 f=1.047$
$-n_6-n_5/r_9 f=0.033$ Various aberration characteristic curves of the present embodiment are shown in FIGS. 2a to 2d. FIG. 2a shows the spherical aberrations, FIG. 2b the astigmatisms, FIG. 2c the distortion, and FIG. 2d the chromatic aberrations due to magnification.

As seen from these aberration characteristic curves, the invention makes it possible to significantly correct various aberrations and provide a super telephoto lens system having a small telephoto ratio and excellent optical properties.

What is claimed is:

1. A super telephoto lens system having a small telephoto ratio, which comprises front lens components consisting of a biconvex lens element, biconcave lens element and positive compound meniscus lens compoelements $n_1$ to $n_6$ and Abbe's numbers of the successive lens elements $\nu_1$ to $\nu_6$ are defined by the following values.

| | | | | | | |
|---|---|---|---|---|---|---|
| $r_1$ | 30.684 | | | | | |
| | | $d_1$ | 2.504 | $n_1$ | 1.48749 $\nu_1$ | 70.1 |
| $r_2$ | −86.122 | | | | | |
| | | $d_2$ | 5.587 | | | |
| $r_3$ | −76.806 | | | | | |
| | | $d_3$ | 1.002 | $n_2$ | 1.80452 $\nu_2$ | 39.6 |
| $r_4$ | 189.665 | | | | | |
| | | $d_4$ | 0.200 | | | |
| $r_5$ | 23.362 | | | | | |
| | | $d_5$ | 2.337 | $n_3$ | 1.48749 $\nu_3$ | 70.1 |
| $r_6$ | −54.291 | | | | | |
| | | $d_6$ | 0.835 | $n_4$ | 1.61340 $\nu_4$ | 43.8 |
| $r_7$ | 61.567 | | | | | |
| | | $d_7$ | 33.643 | | | |
| $r_8$ | −12.274 | | | | | |
| | | $d_8$ | 0.584 | $n_5$ | 1.71300 $\nu_5$ | 54.0 |
| $r_9$ | 42.912 | | | | | |
| | | $d_9$ | 1.002 | $n_6$ | 1.69895 $\nu_6$ | 30.1 |
| $r_{10}$ | −24.038 | | | | | |

* * * * *